(12) United States Patent
Hirotani

(10) Patent No.: US 7,651,135 B2
(45) Date of Patent: Jan. 26, 2010

(54) OCCUPANT PROTECTION DEVICE OF VEHICLE

(75) Inventor: Yasunari Hirotani, Hatsukaichi (JP)

(73) Assignee: Mazda Motor Corporation (JP)

(*) Notice: Subject to any disclaimer, the term of this patent is extended or adjusted under 35 U.S.C. 154(b) by 0 days.

(21) Appl. No.: 12/250,891

(22) Filed: Oct. 14, 2008

(65) Prior Publication Data

US 2009/0108577 A1    Apr. 30, 2009

(30) Foreign Application Priority Data

Oct. 26, 2007   (JP) ............................. 2007-278654
Oct. 26, 2007   (JP) ............................. 2007-278657
Oct. 26, 2007   (JP) ............................. 2007-278659

(51) Int. Cl.
*B60R 22/04* (2006.01)

(52) U.S. Cl. ...................................................... 280/802

(58) Field of Classification Search .............. 280/801.1, 280/802, 807, 808; 297/470, 471, 472
See application file for complete search history.

(56) References Cited

U.S. PATENT DOCUMENTS 3,850,446 A * 11/1974 Hogensen ................... 280/802
4,349,216 A *  9/1982 Pilarski ....................... 280/807
6,746,049 B2 *  6/2004 Pavlov et al. ................ 280/803
6,863,308 B2 *  3/2005 Motozawa ................... 280/806
7,232,155 B2    6/2007 Nishizawa

FOREIGN PATENT DOCUMENTS

| JP | 04087860 A * | 3/1992 |
| JP | 2002-308045 | 10/2002 |
| JP | 2004-322739 | 11/2004 |
| JP | 2006-199197 | 8/2006 |
| JP | 2006-199198 | 8/2006 |

* cited by examiner

*Primary Examiner*—Faye M. Fleming
(74) *Attorney, Agent, or Firm*—Studebaker & Brackett PC; Donald R. Studebaker

(57) ABSTRACT

A lap-belt pre-tensioner operative to draw in a lap belt is disposed on an upper face of a projecting portion so as to extend in a longitudinal direction of a vehicle from an disposition portion of a lower support member, and on the upper face of the projecting portion is provided a groove portion so as to accommodate the lap-belt pre-tensioner in such a manner that the lap-belt pre-tensioner substantially does not project into an ingress-egress opening. Accordingly, there can be provided an occupant protection device of a vehicle equipped with a slide door in which the lap-belt pre-tensioner does not project into the ingress-egress opening.

25 Claims, 15 Drawing Sheets

OCCUPANT PROTECTION DEVICE OF VEHICLE

BACKGROUND OF THE INVENTION

The present invention relates to an occupant protection device of a vehicle which is equipped with a three-point seatbelt.

The three-point seatbelt includes a shoulder belt operative to support an occupant by extending obliquely from a shoulder to a waist of the occupant and a lap belt operative to protect the occupant by extending laterally over the waist of the occupant. A pre-tensioner operative to draw in the seatbelt at a vehicle collision is generally attached to an end portion of the shoulder belt of the three-point seatbelt. Herein, the pre-tensioner operates at the vehicle collision so that the shoulder belt is mainly pulled so as to press the occupant against the seat properly.

Japanese Utility-Model Publication No. 53-35850 proposed a technology in which in addition to a pre-tensioner which is connected to an end portion of the shoulder belt (shoulder-belt pre-tensioner), another pre-tensioner which is connected to an end portion of the lap belt (lap-belt pre-tensioner) is provided. According to the technology of the above-described publication, the two pre-tensioners operate at the vehicle collision so that both the shoulder belt and the lap belt are pulled, thereby protecting the occupant more properly. The lap-belt pre-tensioner may be disposed inside a side sill, which is provided at a side portion of a vehicle floor, along the side sill so as not to project into an ingress-egress opening. This kind of disposition of the lap-belt pre-tensioner along the side sill is also described in other patent publications, such as Japanese Patent Laid-Open Publication Nos. 2006-199197, 2006-199198, 2004-359028 and U.S. Pat. No. 7,232,155.

Meanwhile, in a vehicle equipped with a slide door, it may be necessary that there are provided a rail for guiding the slide door and a rail box to accommodate the rail. In a slide-door vehicle with a relatively low vehicle floor, a projecting portion which projects toward the inside of the vehicle compartment is provided at the side sill, and a rail box is accommodated at the projecting portion.

In this case, the lap-belt pre-tensioner may not be disposed inside the side sill along the side sill. Herein, while it is considered that the lap-belt pre-tensioner is disposed on an upper face of the projecting portion, this layout may cause a problem in that the lap-belt pre-tensioner projects into the ingress-egress opening.

SUMMARY OF THE INVENTION

An object of the present invention is to provide an occupant protection device of a vehicle equipped with the slide door in which the lap-belt pre-tensioner does not project into the ingress-egress opening.

According to the present invention, there is provided an occupant protection device of vehicle, comprising a side sill provided at both sides of a vehicle floor so as to extend in a longitudinal direction of the vehicle, an ingress-egress opening provided above the side sill, a seat provided on the vehicle floor near the ingress-egress opening, a slide door operative to move so as to slide in the longitudinal direction of the vehicle and close at least part of the ingress-egress opening, a projecting portion provided at the side sill so as to project toward an inside of a vehicle compartment in a vehicle width direction and accommodate a rail for guiding the slide door, a three-point seatbelt device including a seatbelt which has a shoulder belt operative to support an occupant by extending obliquely from a shoulder to a waist of the occupant and a lap belt operative to protect the occupant by extending laterally over the waist of the occupant, an upper support member to support an upper end of the shoulder belt, and a lower support member to support an outside end of the lap belt, wherein a lap-belt pre-tensioner operative to draw in the lap belt is disposed on an upper face of the projecting portion so as to extend in the longitudinal direction of the vehicle from an disposition portion of the lower support member, and on the upper face of the projecting portion is provided a groove portion so as to accommodate the lap-belt pre-tensioner in such a manner that the lap-belt pre-tensioner substantially does not project into the ingress-egress opening.

According to the present invention, even in a case in which the projecting portion to accommodate the rail for guiding the slide door is provided, the lap-belt pre-tensioner can be properly inserted into the groove portion provided on the upper face of the projecting portion so that the lap-belt pre-tensioner does not project into the ingress-egress opening.

According to a preferred embodiment of the present invention, the lap-belt pre-tensioner is disposed on the upper face of the projecting portion so as to extend forward from the disposition portion of the lower support member.

According to another embodiment of the present invention, the ingress-egress opening is separated into a front opening and a rear opening by a pillar which extends upward from a specified portion of the side sill near the seat, the slide door is a door operative to close the rear opening of the ingress-egress opening, the projecting portion is provided so as to extend rearward from the specified portion of the side sill near the seat, and the groove portion is formed at a front end portion of the projecting portion. Thereby, in the vehicle equipped with the slide door operative to close the rear opening of the ingress-egress opening behind the pillar, the lap-belt pre-tensioner is inserted into the groove portion provided at the front end portion of the projecting portion of the side sill so that the lap-belt pre-tensioner can be properly disposed in a space between the seat and the pillar, thereby providing a smooth ingress or egress through the opening According to another embodiment of the present invention, a rail box which is provided so as to open to the outside of the vehicle compartment and accommodate the guide rail is accommodated by the projecting portion, and a front end portion of the rail box is provided so as to obliquely extend forward and toward the inside of the vehicle compartment such that an interference thereof with the groove portion is avoided. Thereby, it can be properly prevented that the rail box interferes with the groove portion into which the lap-belt pre-tensioner is inserted.

According to another embodiment of the present invention, the groove portion is configured such that a forward portion thereof lowers gradually. Thereby, a front end portion of the lap-belt pre-tensioner can be prevented more properly from projecting into the ingress-egress opening.

According to another embodiment of the present invention, a cross member is provided at the vehicle floor so as to extend in the vehicle width direction, an end portion of the cross member is provided so as to contact the projecting portion near the groove portion, and the lap-belt pre-tensioner is configured such that a rigidity thereof in the vehicle width direction is greater than that of the projecting portion. Thereby, the lap-belt pre-tensioner can properly reinforce the rigidity of the projecting portion in the vehicle width direction. Further, a breakage of the lap-belt pre-tensioner itself can be prevented.

According to another embodiment of the present invention, the lap-belt pre-tensioner is disposed on the upper face of the projecting portion so as to extend rearward from the disposition portion of the lower support member. Thereby, even in a case in which the projecting portion to accommodate the rail for guiding the slide door is provided, the lap-belt pre-tensioner can be properly inserted into the groove portion provided on the upper face of the projecting portion so that the lap-belt pre-tensioner does not project into the ingress-egress opening.

According to another embodiment of the present invention, the ingress-egress opening is separated into a front opening and a rear opening by a pillar which extends upward from a specified portion of the side sill near the seat, the slide door is a door operative to close the rear opening of the ingress-egress opening, the projecting portion is provided so as to extend rearward from the specified portion of the side sill near the seat, and the groove portion is formed at a specified portion of the projecting portion which is rearward from the pillar. Thereby, in the vehicle equipped with the slide door operative to close the rear opening of the ingress-egress opening behind the pillar, the lap-belt pre-tensioner is inserted into the groove portion provided at the specified portion of the projecting portion which is rearward from the pillar so that the lap-belt pre-tensioner can be properly disposed in the space between the seat and the pillar, thereby providing the smooth ingress or egress through the opening According to another embodiment of the present invention, the groove portion is disposed so as not to overlap with the guide rail in a plan view. Thereby, the interference between the groove portion and the guide rail can be prevented.

According to another embodiment of the present invention, the lower support member is disposed on the outside of the guide rail, the groove portion is disposed on the inside of the guide rail, and the lap-belt pre-tensioner is disposed so as to intersect the guide rail in the plan view. Thereby, respective members can be disposed at proper positions, avoiding any improper interference among them.

According to another embodiment of the present invention, the groove portion is configured such that a rearward portion thereof lowers gradually. Thereby, a rear end portion of the lap-belt pre-tensioner can be prevented from projecting upward from the side sill so that the lap-belt pre-tensioner can be prevented more properly from projecting into the ingress-egress opening.

According to another embodiment of the present invention, a wall face of the groove portion has a specified shape which can temporally fix the lap-belt pre-tensioner into the groove portion. Thereby, the temporal fixing of the lap-belt pre-tensioner can be achieved by merely inserting the lap-belt pre-tensioner into the groove portion, thereby improving an attachment.

According to another embodiment of the present invention, a retractor operative to wind up one end of the shoulder belt and a shoulder-belt pre-tensioner operative to draw in the shoulder belt are disposed above and on the outside of the lap-belt pre-tensioner so as to be covered with a pillar trim, which covers the inside of the pillar, from the inside of the vehicle compartment. Thereby, the pillar can be prevented from projecting toward the inside of the vehicle compartment due to providing the retractor and the shoulder-belt pre-tensioner. Further, since the lap-belt pre-tensioner is inserted into the groove portion formed on the upper face of the projecting portion of the side sill, it can be properly located in a dead space beside the seat along the side sill. Thus, the lap-belt pre-tensioner, the shoulder-belt pre-tensioner, and the retractor can be properly disposed without narrowing the space of the vehicle compartment.

According to another embodiment of the present invention, the pillar is comprised of a plurality of panels which have a flange at least one end thereof in the longitudinal direction, a seaming welt is provided at the pillar so as to cover the flanges of the plural panels overlapped with each other, a pillar trim is provided so as to cover the inside of the pillar, the lower support member and the lap-belt pre-tensioner are provided at or near a lower end portion of the pillar, the lap-belt pre-tensioner is covered with the pillar trim from the inside of the vehicle compartment, and the pillar trim includes a through hole, through which a member extending from the lap belt to the lap-belt pre-tensioner or the lap belt itself extend, a notch which is provided so as to extend from the through hole to one end of the pillar trim in the longitudinal direction, and a fixed portion which is fixed at least to an upper peripheral portion of the seaming welt above an end portion of the notch and a lower peripheral portion of the seaming welt below the end portion of the notch. Thereby, since the lap-belt pre-tensioner is covered with the pillar trim, no other cover member than the pillar trim for covering the pre-tensioner may not be necessary, so that the parts number may be reduced. Further, since the pillar trim includes the above-described through hole and the notch, attaching of the lap belt or the above-described member into the through hole of the pillar trim or detaching of the lap belt or the member from the through hole can be easily conducted through the notch in a state in which the seat belt, the lap-belt pre-tensioner and the seat are attached. Accordingly, this attaching/detaching operation can be conducted in the longitudinal direction of the vehicle, so that the attachment/detachment of the pillar trim can be easily conducted even in a narrow space between the seat and the pillar. Further, since the pillar trim includes the fixed portion, the notch portion can be made in the closed state surely by fixing the upper and lower peripheral portions. Thereby, the notch can be made unnoticeable as much as possible, thereby maintaining a proper appearance of the inside of the vehicle compartment.

According to another embodiment of the present invention, a pillar trim is provided so as to cover the inside of the pillar, the lower support member and the lap-belt pre-tensioner are provided at or near a lower end portion of the pillar, the lap-belt pre-tensioner is covered with the pillar trim from the inside of the vehicle compartment, the pillar trim includes a straight bent portion which extends substantially in the longitudinal direction, a through hole, through which a member extending from the lap belt to the lap-belt pre-tensioner or the lap belt itself extend, and a notch which is provided so as to extend from the through hole to one end of the pillar trim in the longitudinal direction, and the through hole and the notch are formed at the bent portion. Thereby, the similar advantages to the above described embodiment can be obtained. In addition, since the pillar includes the above-described bent portion at which the though hole and the notch are formed, the through hole and the notch can be made unnoticeable as much as possible, thereby maintaining the proper appearance of the inside of the vehicle compartment.

According to another embodiment of the present invention, the pillar trim is made of a resilient member, and the notch is configured such that a resiliency of the pillar trim makes the notch in a closed state when no load is applied. Thereby, the notch can be made unnoticeable more properly, thereby maintaining the proper appearance of the inside of the vehicle compartment.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings. Herein, the directions will be described by using relevant words (for example, "above" "below" "left" "right" and others words including these), however, these words are merely used for the purpose of helping understanding of the present invention. The present invention should not be limited by the use of these words.

Embodiment 1

Figure 1:
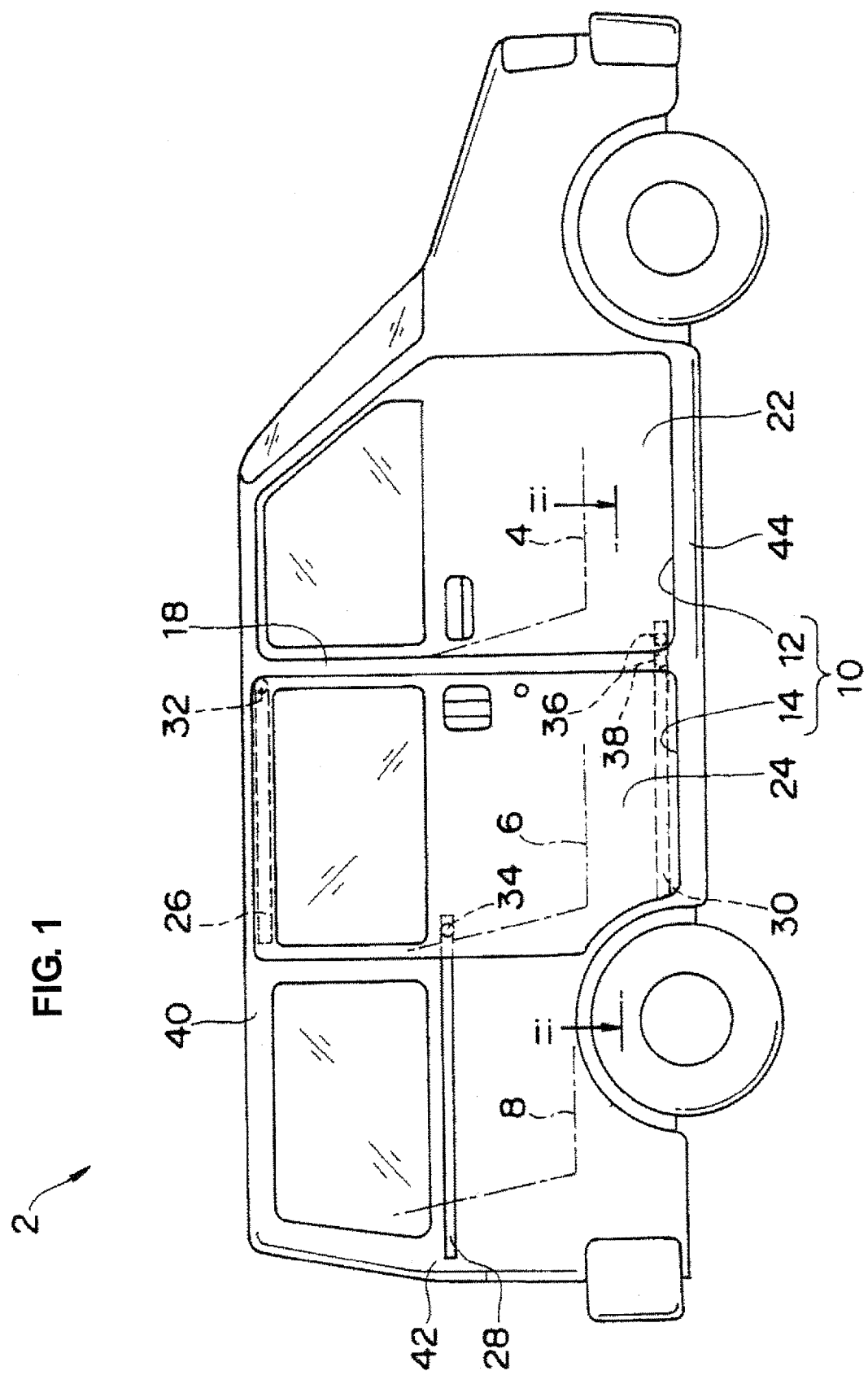
FIG. 1 is a schematic diagram of a vehicle according to a first embodiment of the present invention.

FIG. 1 is a schematic diagram of a vehicle 2 equipped with an occupant protection device according to a first embodiment of the present invention.

In the present embodiment, the vehicle 2 comprises a first row seat 4, a second row seat 6 and a third row seat 8. Herein, the "front seat" indicates the first row seat 4, and the "rear seat" indicates the second row seat 6 and the third row seat 8.

A pair of side sills 44 is provided so as to extend on both sides of a vehicle floor, and an ingress-egress opening 10 is formed above a side sill 44. The ingress-egress opening 10 is separated into a front opening (ingress-egress opening for the front seat) 12 and a rear opening (ingress-egress opening for the rear seat) 14 by a center pillar 18 which extends upward from a specified portion of the side sill 44 near the front seat 4. The front opening 12 for the front seat can be closed by a hinge door 22 and the rear opening 14 for the rear seat can be closed by a slide door 24. Herein, the present invention can be applied to not only the vehicle equipped with the slide door shown in FIG. 1 but a vehicle in which all ingress-egress openings are closed by respective hinge doors. Also, the present invention can be applied to a vehicle in which a single ingress-egress opening is provided for both the front seat and the rear seat without the center pillar.

As rails for guiding the slide door 24, an upper rail 26 is provided at a side edge 40 of a vehicle ceiling, a center rail 28 is provided at a belt line 42 on a side face of a vehicle rear portion, and a lower rail 30 is provided at the side sill 44. Sliders 32, 34, 36, 38 of the slide door 24 engage with the respective rails 26, 28, 30 so as to slide in the rails. Thus, the slide door 24 can slide in the longitudinal direction of the vehicle with the guidance of the rails 26, 28, 30.

Figure 2:
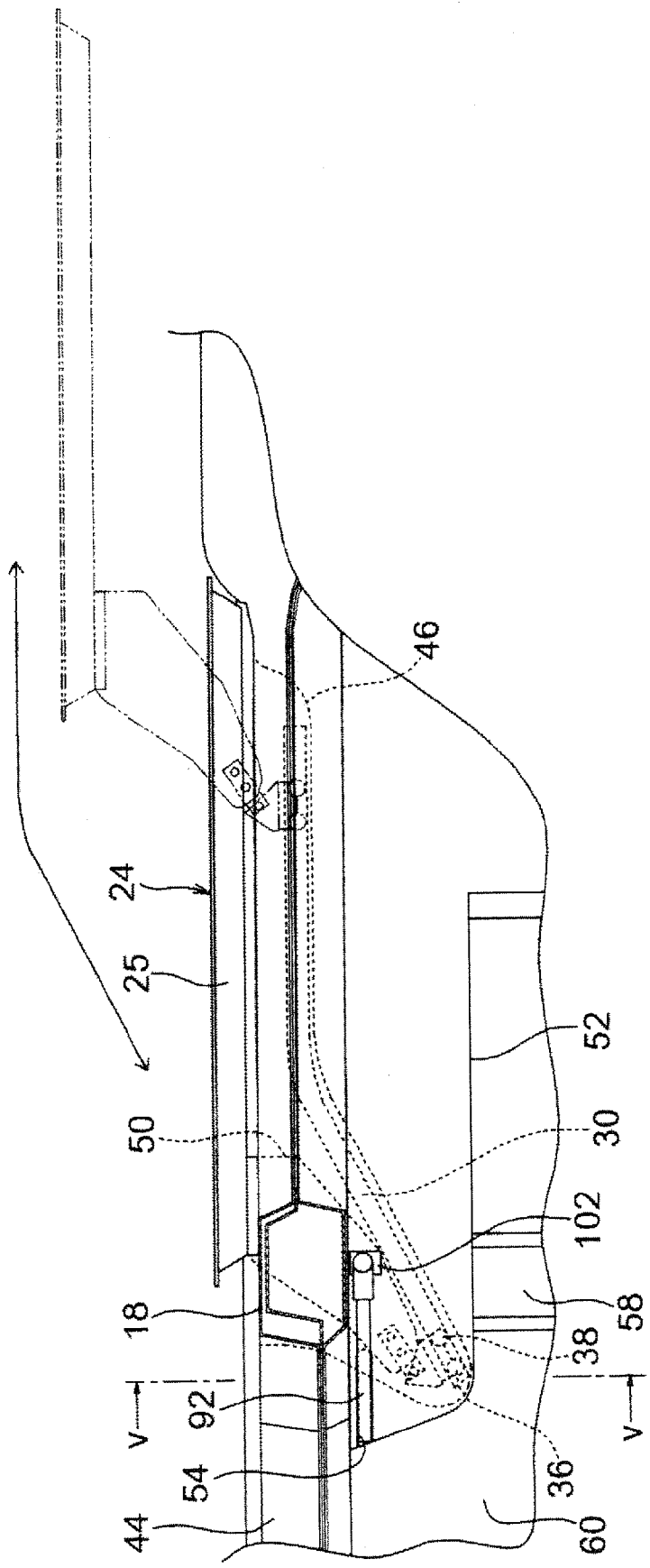
FIG. 2 is a sectional view taken along line ii-ii of FIG. 1, which shows structure of a lower end portion of a slide door.

FIG. 2 is a sectional view taken along line ii-ii of FIG. 1, which shows structure of a lower end portion of a slide door. In the FIG. 2, illustration of interior members such as a pillar trim 72, which will be described below, is omitted to facilitate understanding of the present invention. As shown in FIG. 2, the slide door 24 has a lower arm 50 which extends obliquely forward and toward the inside of the vehicle compartment from a lower end portion of a door body 25. Two sliders 36, 38 are attached to a tip of the lower arm 50, for example. The sliders 36, 38, which comprise rotatable rollers around axes extending vertically, for example, engage with a rail 30 (see FIG. 7) having a U-shaped cross section which opens downward, for example.

Figure 3:
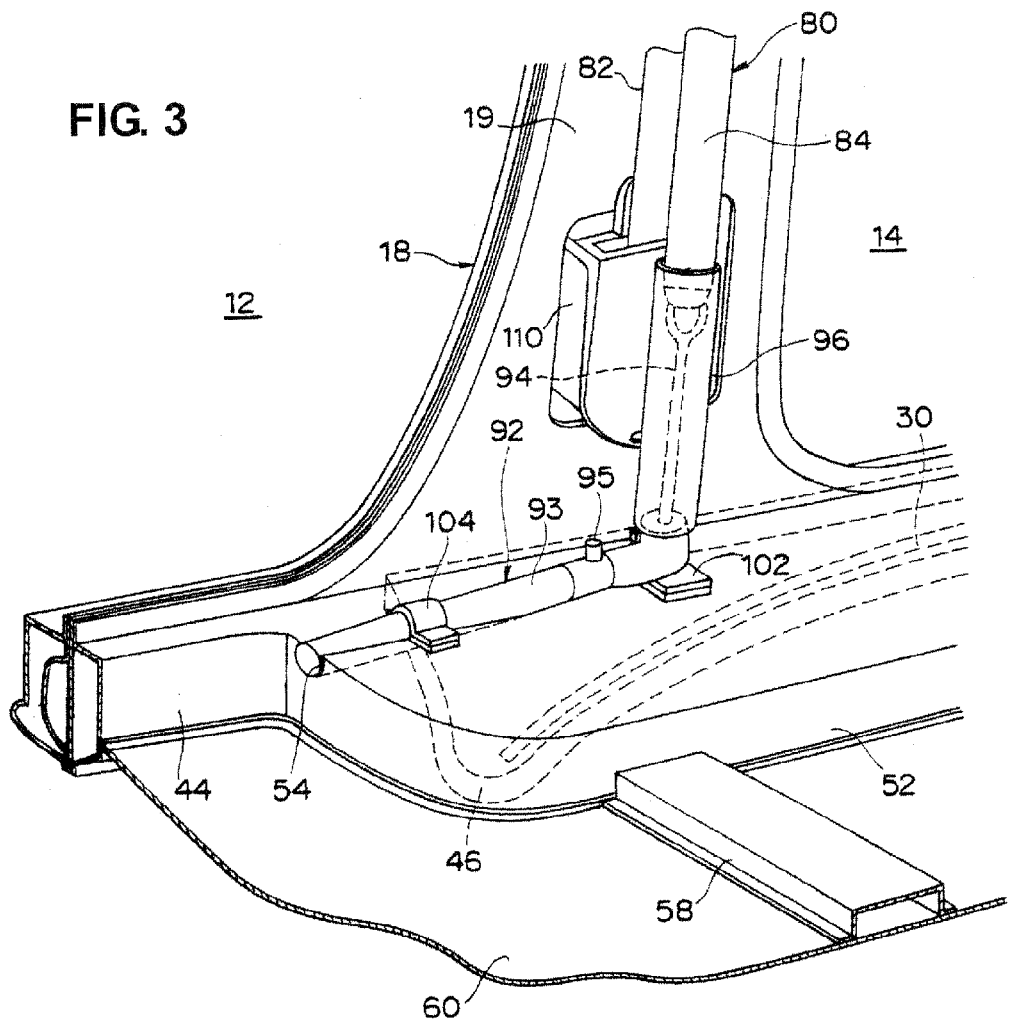
FIG. 3 is a perspective view showing around the lower end portion of a center pillar.

FIG. 3 is a perspective view showing around the inside of the lower end portion of the center pillar 18. In FIG. 3, the illustration of the interior members such as the pillar trim 72, which will be described below, is omitted to facilitate understanding of the present invention. As shown in FIG. 3, a front end portion of the rail 30 curves obliquely forward and toward the inside of the vehicle compartment. Thereby, when the sliders 36, 38 move to the front end portion of the rail 30 and the slide door 20 is closed, the slide door 24 can be pulled in toward the inside of the vehicle compartment. A front end of the rail 30 is located at a portion near the front seat 4 which is forward from the ingress-egress opening 14 for the rear seat, which corresponds to a shape of the lower arm 50 of the slide door 24.

Figure 4:
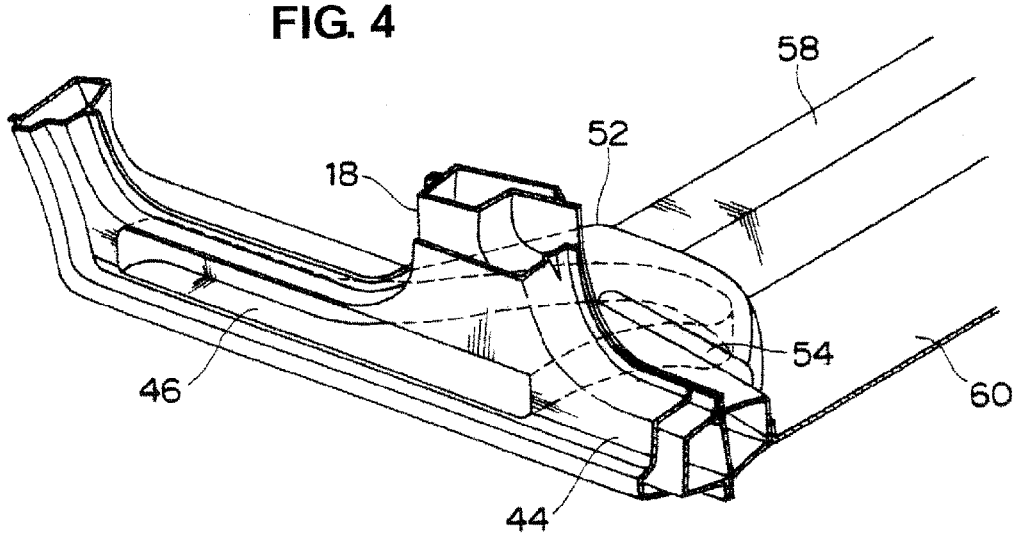
FIG. 4 is a perspective view of a side sill, when seen from the outside of a vehicle compartment.

FIG. 4 is a perspective view of the side sill, when seen from the outside of the vehicle compartment. As shown in FIG. 4, a rail box 46 to accommodate the rail 30 opens to the outside of the vehicle compartment, thereby preventing the lower arm 50 of the slide door 24 from interfering with the rail box 46. A front end portion of the rail box 46 projects obliquely forward and toward the inside of the vehicle compartment, which corresponds to a shape of the rail 30.

Figure 5:
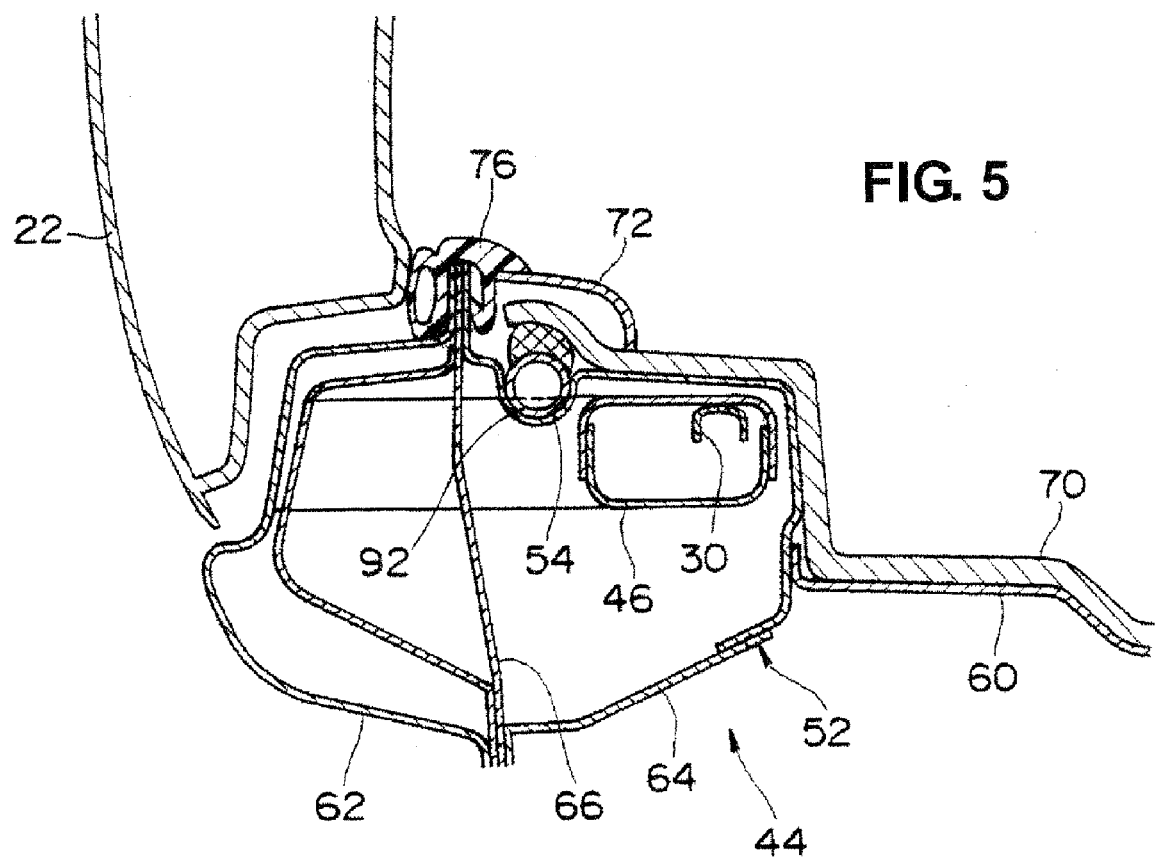
FIG. 5 is a sectional view taken along line v-v of FIG. 2 showing the side sill.

FIG. 5 is a sectional view taken along line v-v of FIG. 2 showing the side sill. As shown in FIG. 5, the side sill 44 comprises an outer panel 62 which is disposed on the outside of the vehicle compartment, an inner panel 64 which is disposed on the inside of the vehicle compartment, and a reinforcement 66 which is disposed between the outer panel 62 and the inner panel 64. Respective outer end portions of the outer panel 62, inner panel 64 and reinforcement 66 are fixed to each other, and the fixing portion is covered with a seaming welt 76. A floor panel 60 is attached to the inside face of the side sill 44, and a floor mat 70 is disposed on the floor panel 60.

Returning to FIG. 3, at the side sill is provided a projecting portion 52 which projects toward the inside of the vehicle compartment, and the projecting portion 52 accommodates the rail box 46. The projecting portion 52 extends from near the front seat 4 toward the rear of the vehicle so as to correspond to a shape of the rail box 46. Specifically, the projecting portion 52 is provided at a specified portion which is located from below the pillar 18 to below the ingress-egress opening 14 for the rear seat. On an upper face of the projecting portion 52 is provided a groove portion 54, into which a lap-belt pre-tensioner 92, which will be described later, is inserted, such that the lap-belt pre-tensioner 92 does not project into the ingress-egress opening 12 for the front seat. A wall face of the groove portion 54 has a specified shape which can temporally fix the lap-belt pre-tensioner 92 into the groove portion. The groove portion 54 is formed (provided) at a front end portion of the projecting portion 52 so as to extend in the longitudinal direction of the vehicle. The groove portion 54 is configured such that its forward portion lowers gradually. The groove portion 54 is formed (provided) at the outside end portion of the projecting portion 52. As described above, the front end portion of the rail box 46 projects obliquely forward and toward the inside of the vehicle compartment. Thereby, a space is generated at the outside end portion of the front end portion of the projecting portion 52, so that the groove portion 54 may not interfere with the rail box 46. An end of a cross member 58, which is provided at the vehicle floor so as to extend in the vehicle width direction, connects to a specified portion of the projecting portion 52 which is near the groove portion 54.

Figure 6:
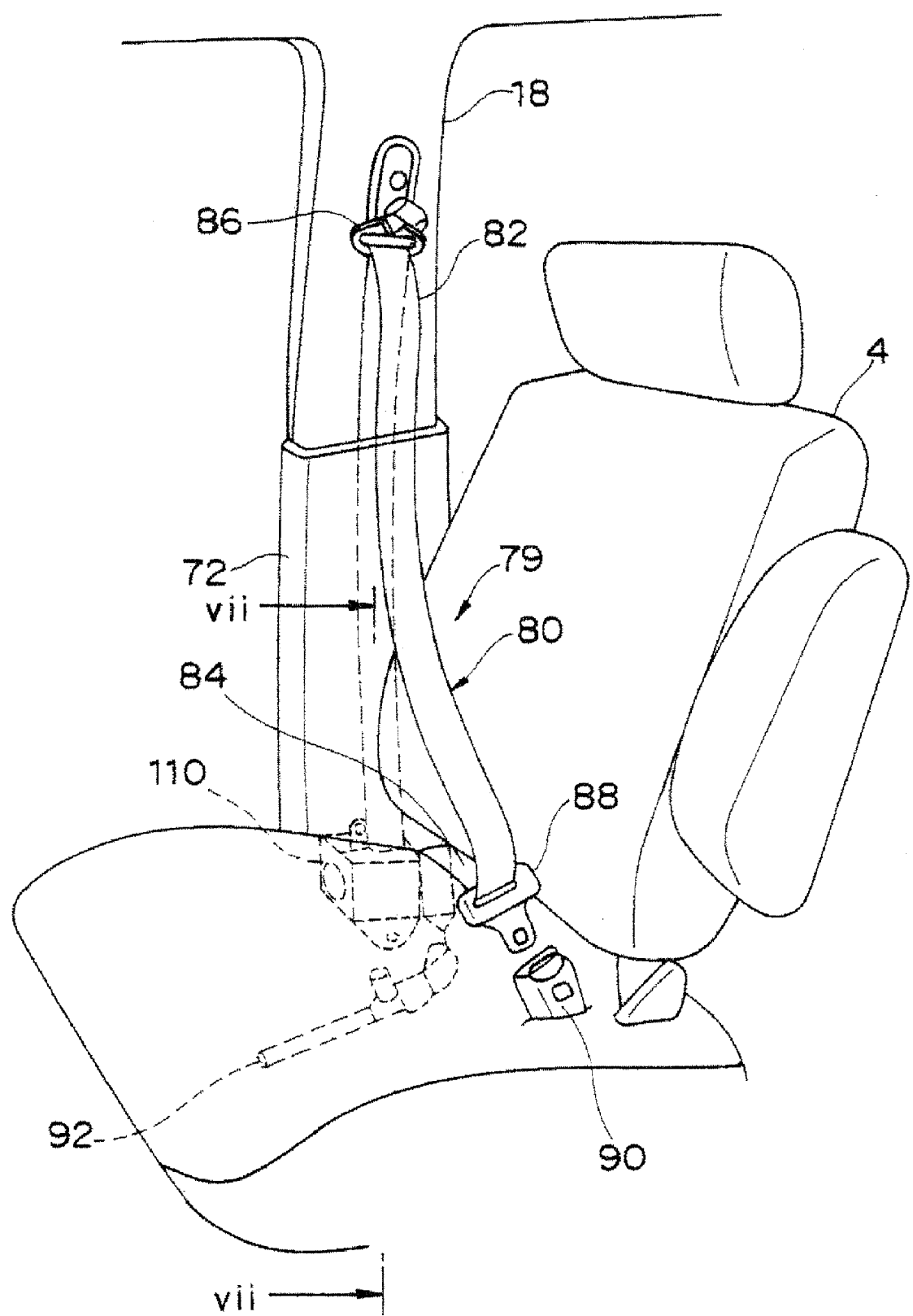
FIG. 6 is a perspective view of a three-point seatbelt device.

FIG. 6 is a perspective view of a three-point seatbelt device. As shown in FIG. 6, a three-point seatbelt device 79 is attached to the front seat 4. A seatbelt 80 of the three-point seatbelt device 79 has a shoulder belt 82 operative to support an occupant by extending obliquely from a shoulder to a waist of the occupant and a lap belt 84 operative to protect the occupant by extending laterally over the waist of the occupant. While the shoulder belt 82 and the lap belt 84 are formed integrally in the present embodiment, these may be formed separately. An upper end of the shoulder belt 82 is supported at a belt guide (an upper support member) 86 which is attached to an upper portion of the center pillar 18. An outside end of the shoulder belt 82 is attached to a retractor 110 which is equipped with a shoulder-belt pre-tensioner. The retractor 110 equipped with the shoulder-belt pre-tensioner combines a retractor operative to wind up an end portion of the shoulder belt 82 and a shoulder-belt pre-tensioner operative to draw in the shoulder belt 82 at a vehicle collision or the like. Herein, the retractor and the shoulder-belt pre-tensioner may be formed separately according to the present invention.

Figure 7:
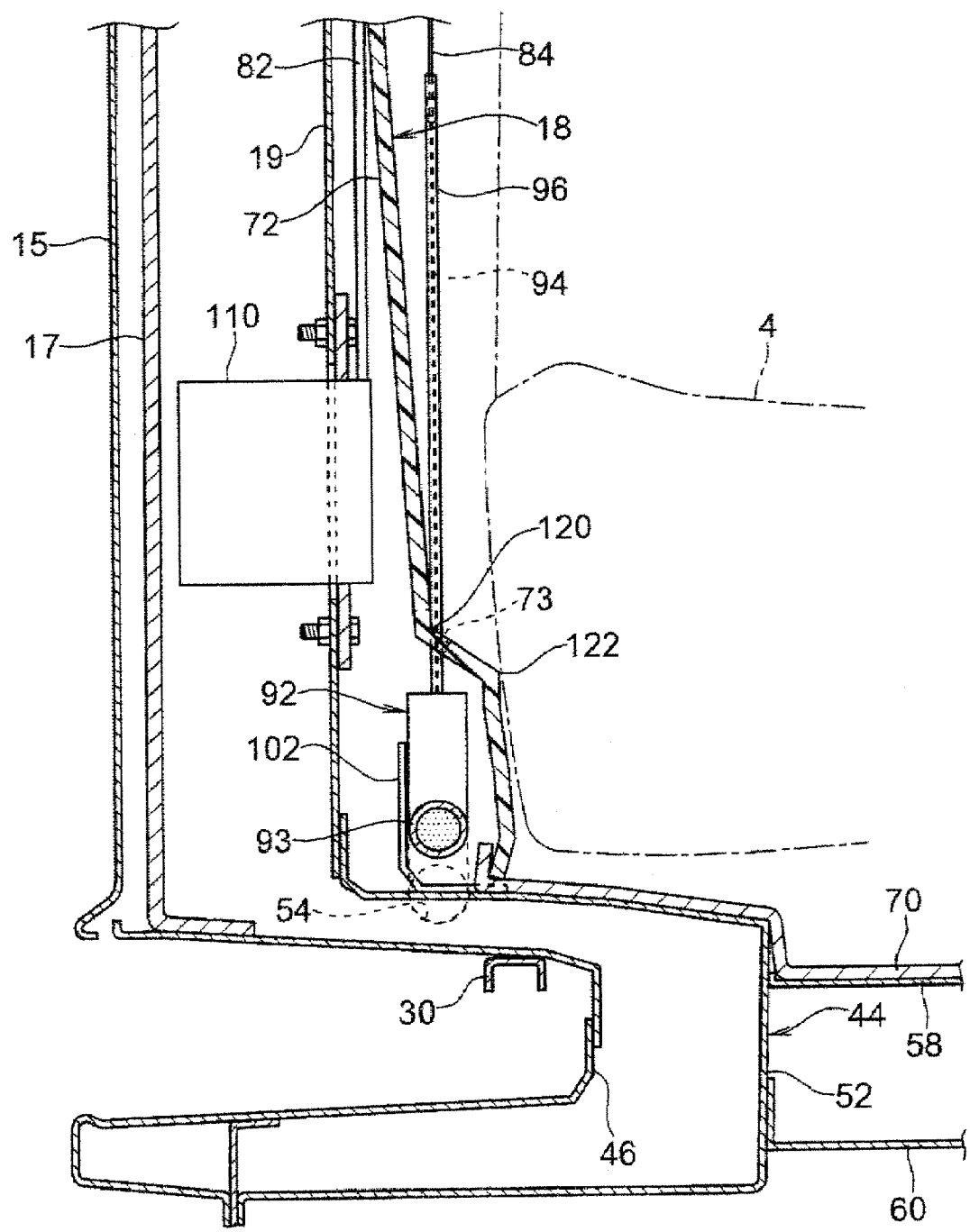
FIG. 7 is a sectional view taken along line vii-vii of FIG. 6 showing structure around a lap-belt pre-tensioner.

FIG. 7 is a sectional view taken along line vii-vii of FIG. 6 showing structure around the lap-belt pre-tensioner. As shown in FIG. 7, the retractor 110 equipped with the shoulder-belt pre-tensioner is attached to an inner panel 19 of the center pillar 18 and covered with the pillar trim 72, which covers the inside of the center pillar 18 from the inside of the vehicle compartment. The specific structure of the center pillar 18 will be described later.

Returning to FIG. 6, a tongue 88, which is operative to connect to a buckle 90 at the application of the seat belt 80 to the occupant, is attached to the inside end of the lap belt 84, namely the border between the lap belt 84 and the shoulder belt 82. The outside end portion of the lap belt 84 is attached to the lap-belt pre-tensioner 92 which is fixed to a lower anchor (lower support member) 102. Thereby, the outside end portion of the lap belt 84 is supported at the lower anchor 102 via the lap-belt pre-tensioner 92.

Returning to FIG. 3, the lower anchor 102 is fixed to a specified portion of the upper face of the projecting portion 52 which is beside the center pillar 18 or a rear end portion of the seat 4 via welding, bolts or the like. While the lower anchor 102 is formed so as to have a L-shaped cross section, the shape of the lower anchor 102 is not limited to this. Further, the lower anchor 102 may be fixed to the center pillar 18.

The lap-belt pre-tensioner 92 is a device to draw in the lap belt 84 at the vehicle collision or the like. Various types of device may be applied, such as an inflator type of pre-tensioner. This inflator type of pre-tensioner 92 comprises a substantially circular-cylindrical-shaped cylinder 93, a piston (not illustrated) accommodated in the cylinder 93, a gas generator, such as a powder, accommodated in the cylinder 93, an igniter 95 to ignite the gas generator, and a wire 94 which is coupled to the piston at one end and coupled to the lap belt 84 at the other end, respectively. The wire 94 is covered with a cover member 96 which is provided so as to extend from the lap belt 84 to the lap-belt pre-tensioner 92. When a specified deceleration of the vehicle 2 is detected by a sensor, not illustrated, at the vehicle collision or the like, ECU (Electronic Control Unit), not illustrated, supplies a signal to the igniter 95. The igniter 95 ignites the gas generator when receiving the signal, so that the gas is generated in the cylinder 93. Then, the piston in the cylinder 93 is pushed forward by the generated gas, so that the wire 94 is pulled forward. Accordingly, the lap belt 84 coupled to the wire 94 is pulled downward, so that the waist of the occupant can be pressed against the seat 4 properly.

The cylinder 93 of the pre-tensioner 92 is made of a strong material, such as metal, so as to be properly against the pressure of the generated gas in the cylinder and have a specified thickness. Thereby, the cylinder 93 has a higher rigidity than the projecting portion 52 in the vehicle width direction. Thus, the cylinder 93 of the pre-tensioner 92 which is inserted into the groove portion 54 can properly reinforce the rigidity of the projecting portion 52, thereby increasing the strength of the side sill 44.

The lap-belt pre-tensioner 92, which is of a cylindrical shape as a whole, is disposed so as to extend forward from the disposition portion of the lower anchor 102 on the upper face of the projecting portion 52. Accordingly, since the lap-belt pre-tensioner 92 does not project into the ingress-egress opening for the rear seat, the smooth ingress or egress for the rear seats 6, 8 can be achieved. The lap-belt pre-tensioner 92 is fixed to the lower anchor 102 at its rear end portion, while it is inserted into the groove portion 54 of the projecting portion 52 at its portion which extends from its front end portion to its central portion. As described above, since the groove portion 54 is configured such that its forward portion lowers gradually, the front end portion of the pre-tensioner 92 which is inserted into the groove portion 54 can be prevented from projecting above the side sill 44. Thereby, the pre-tensioner 92 can be prevented from projecting into the ingress-egress opening 12 for the front seat, allowing the disposition of the lower anchor 102 at a proper location relative to the first row seat 4, so that the smooth ingress or egress for the front seat 4 and the seat assembly can be properly achieved. Herein, the inserted portion of the pre-tensioner 92 into the groove portion 54 is fixed to the upper face of the projecting portion 52 with a bracket 104.

Figure 8:
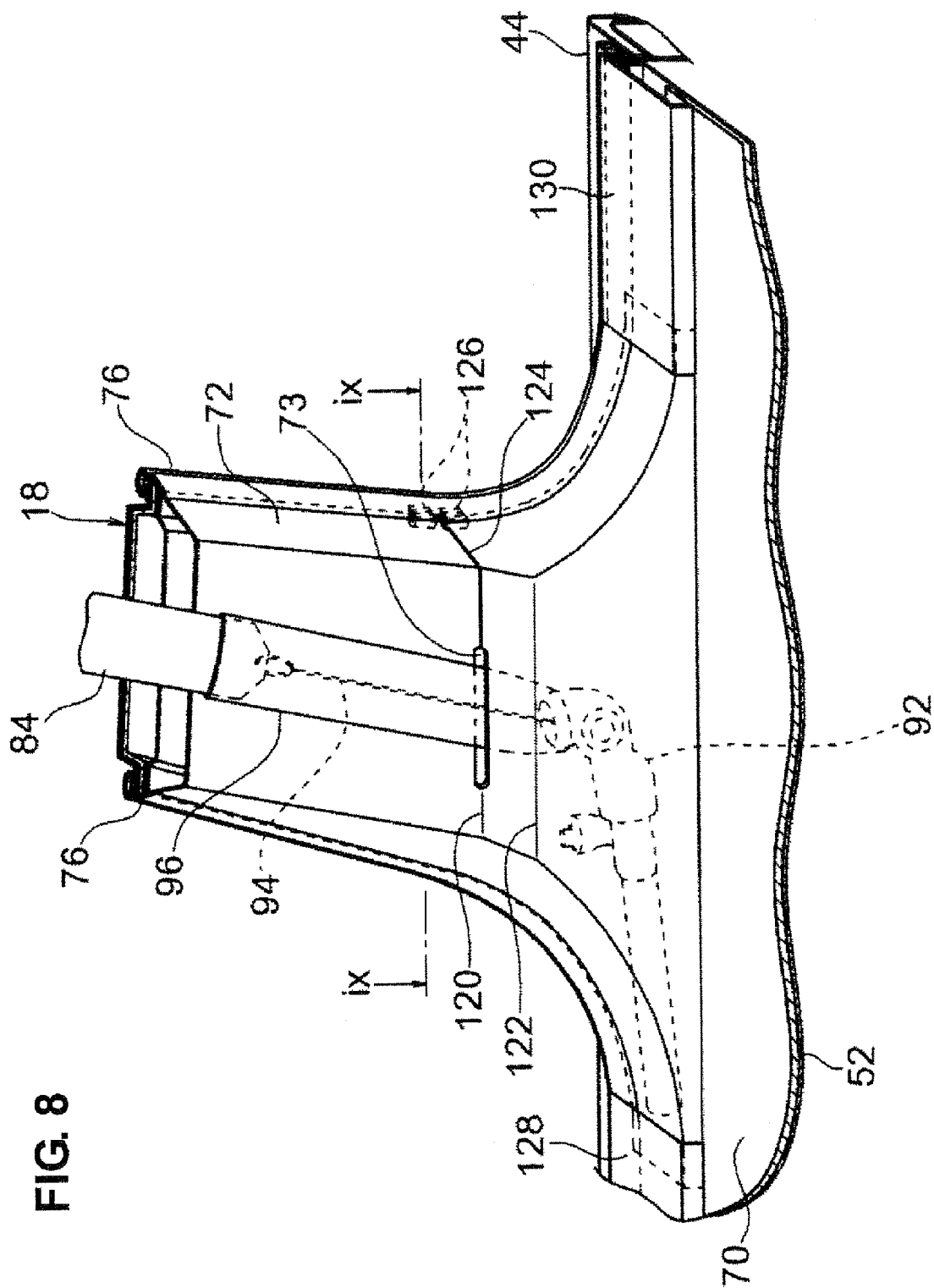
FIG. 8 is a perspective view of the lower end portion of the center pillar and its surrounding.
Figure 9:
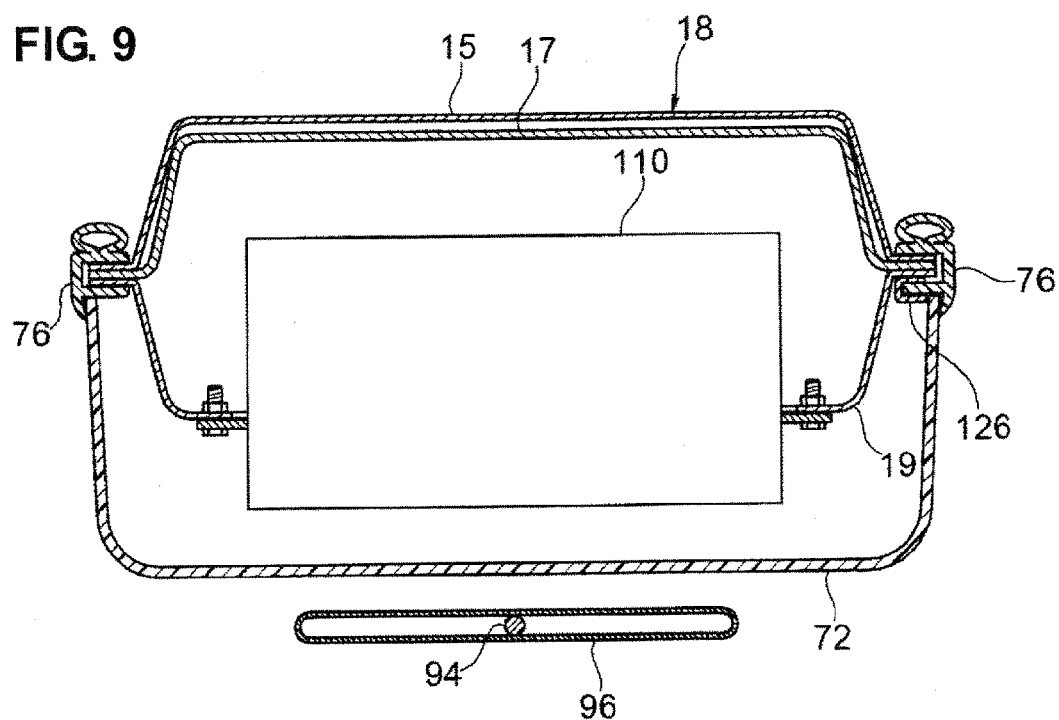
FIG. 9 is a sectional view taken along line ix-ix of FIG. 8 showing around an upper portion of a through hole of a pillar trim.

FIG. 8 is a perspective view of the lower end portion of the center pillar and its surrounding. FIG. 9 is a sectional view taken along line ix-ix of FIG. 8 showing around an upper portion of a through hole of a pillar trim. As shown in FIG. 9, the center pillar 18 includes an outer panel 15 which is disposed on the outside of the vehicle compartment, an inner panel 19 which is disposed on the inside of the vehicle compartment, and a reinforcement 17 which is disposed between the outer panel 15 and the inner panel 19. The outer panel 15, the inner panel 19 and the reinforcement 17 are fixed to each other at both ends of those in the longitudinal direction, and this fixing portion is covered with a seaming welt 76.

Figure 10:
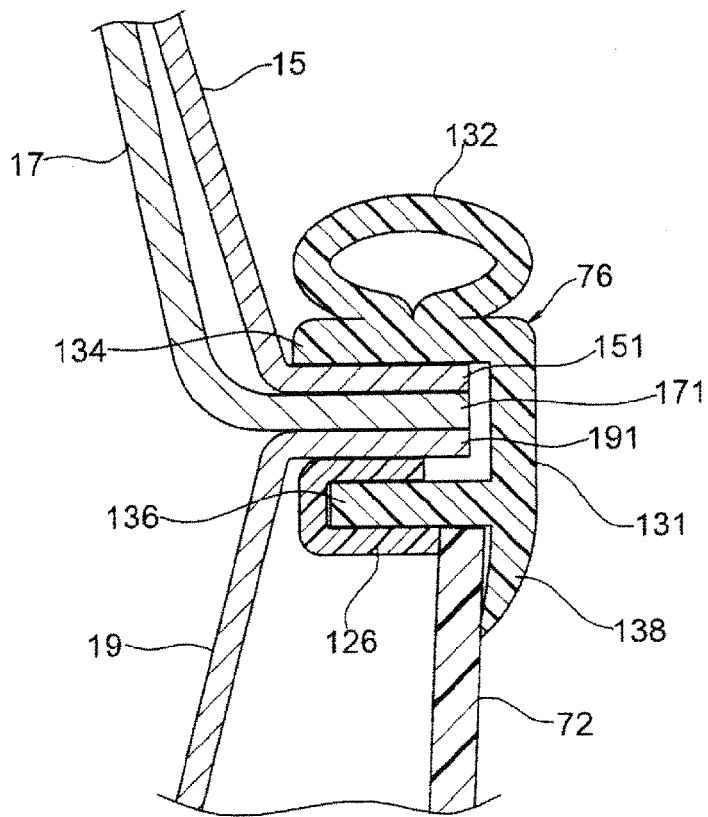
FIG. 10 is an enlarged sectional view of flanges of the pillar.
Figure 11:
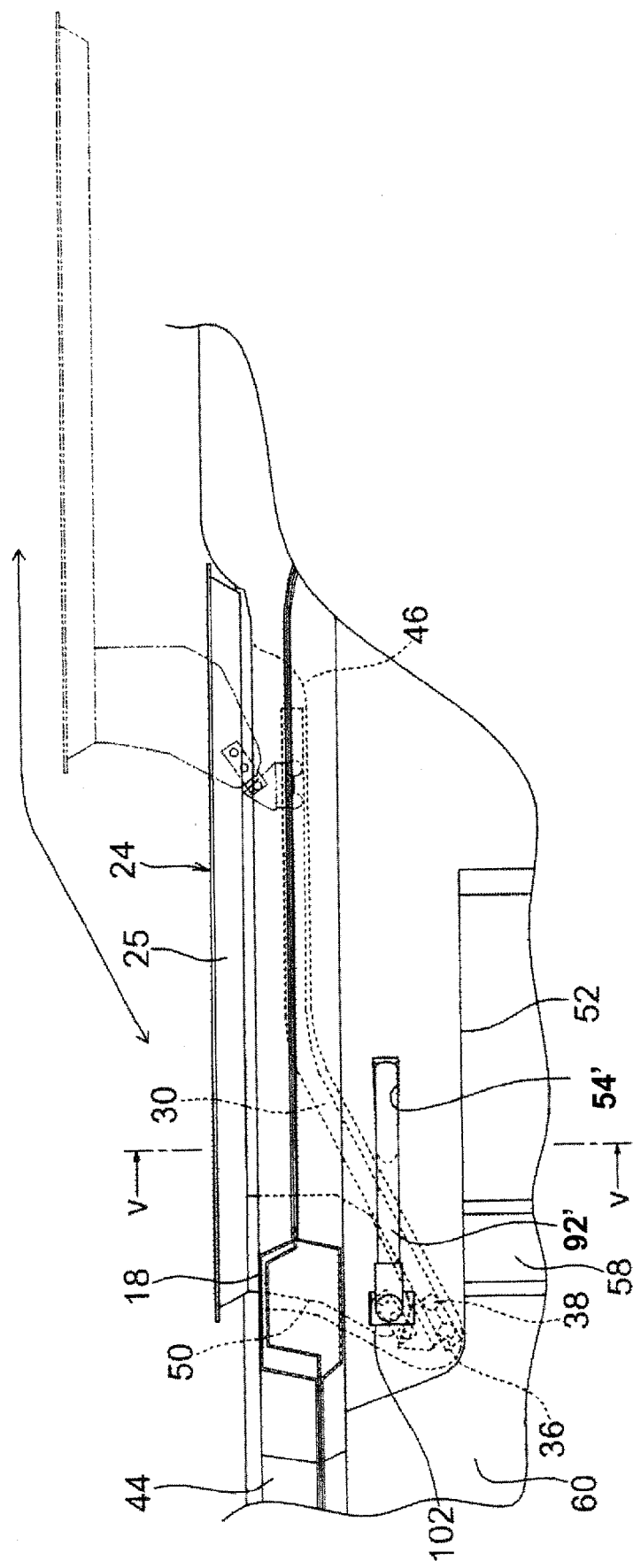
FIG. 11 is a sectional view showing structure of a lower end portion of a slide door according to a second embodiment of the present invention, which corresponds to FIG. 2 of the first embodiment.
Figure 12:
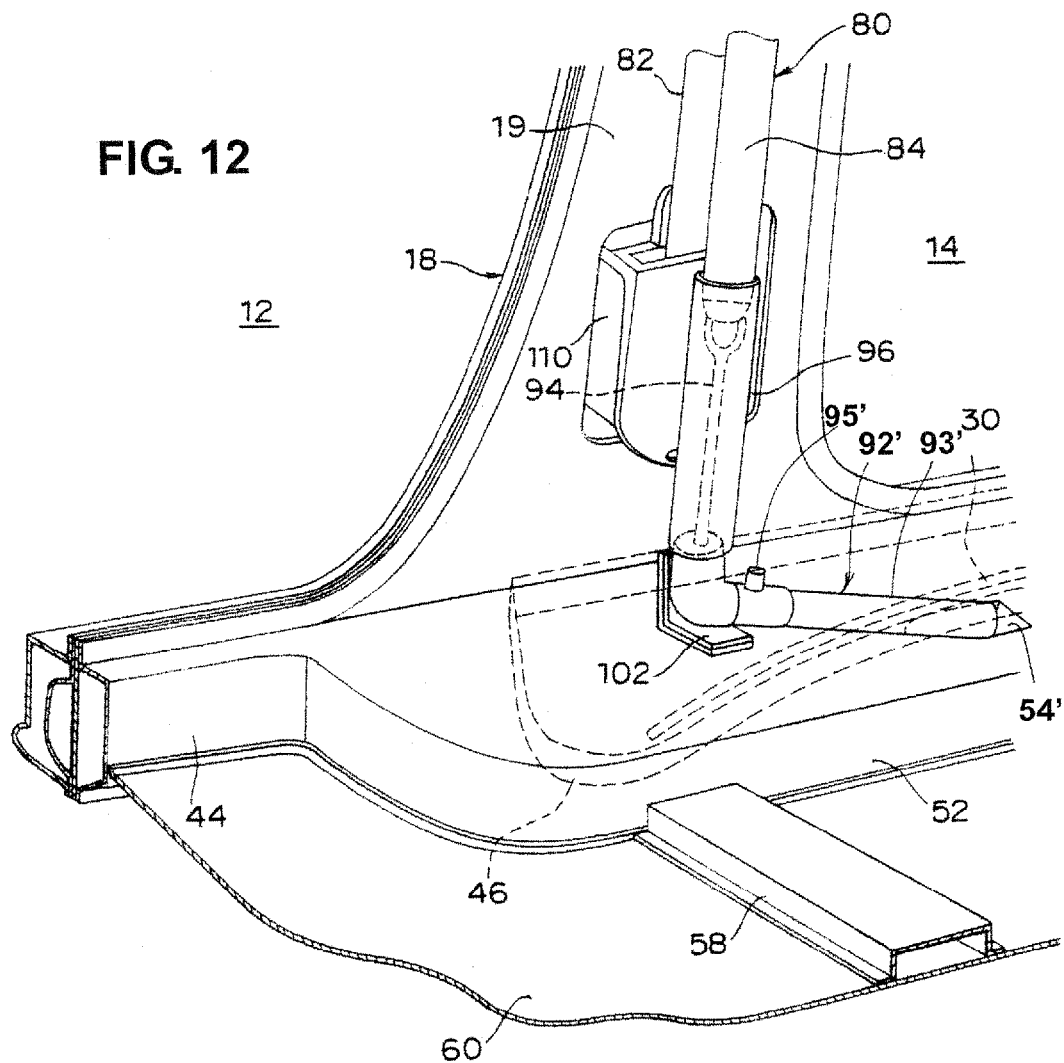
FIG. 12 is a perspective view showing around the lower end portion of the center pillar of the second embodiment.
Figure 13:
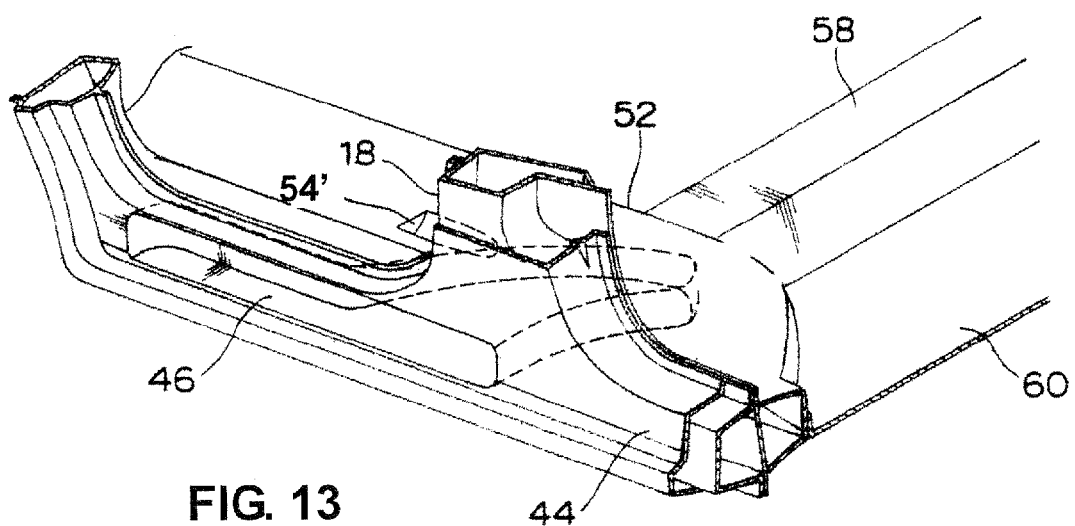
FIG. 13 is a perspective view of the side sill of the second embodiment, when seen from the outside of the vehicle compartment.
Figure 14:
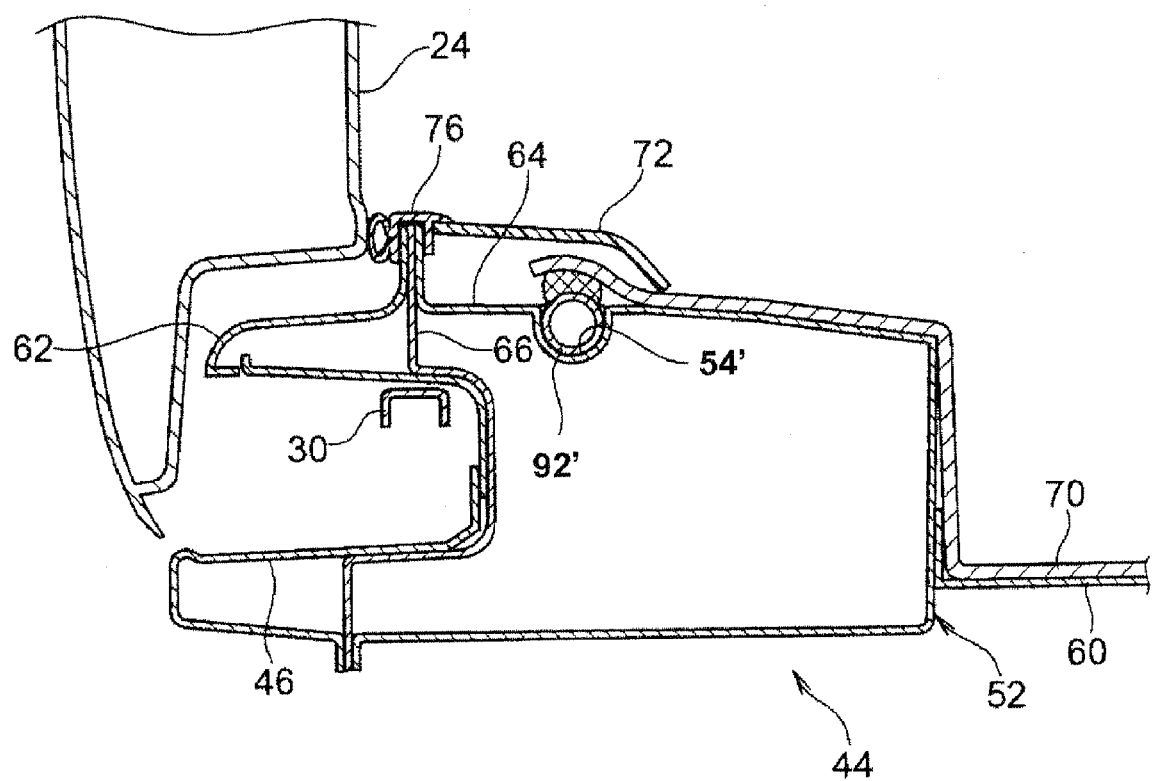
FIG. 14 is a sectional view taken along line v-v of FIG. 11 showing the side sill of the second embodiment.
Figure 15:
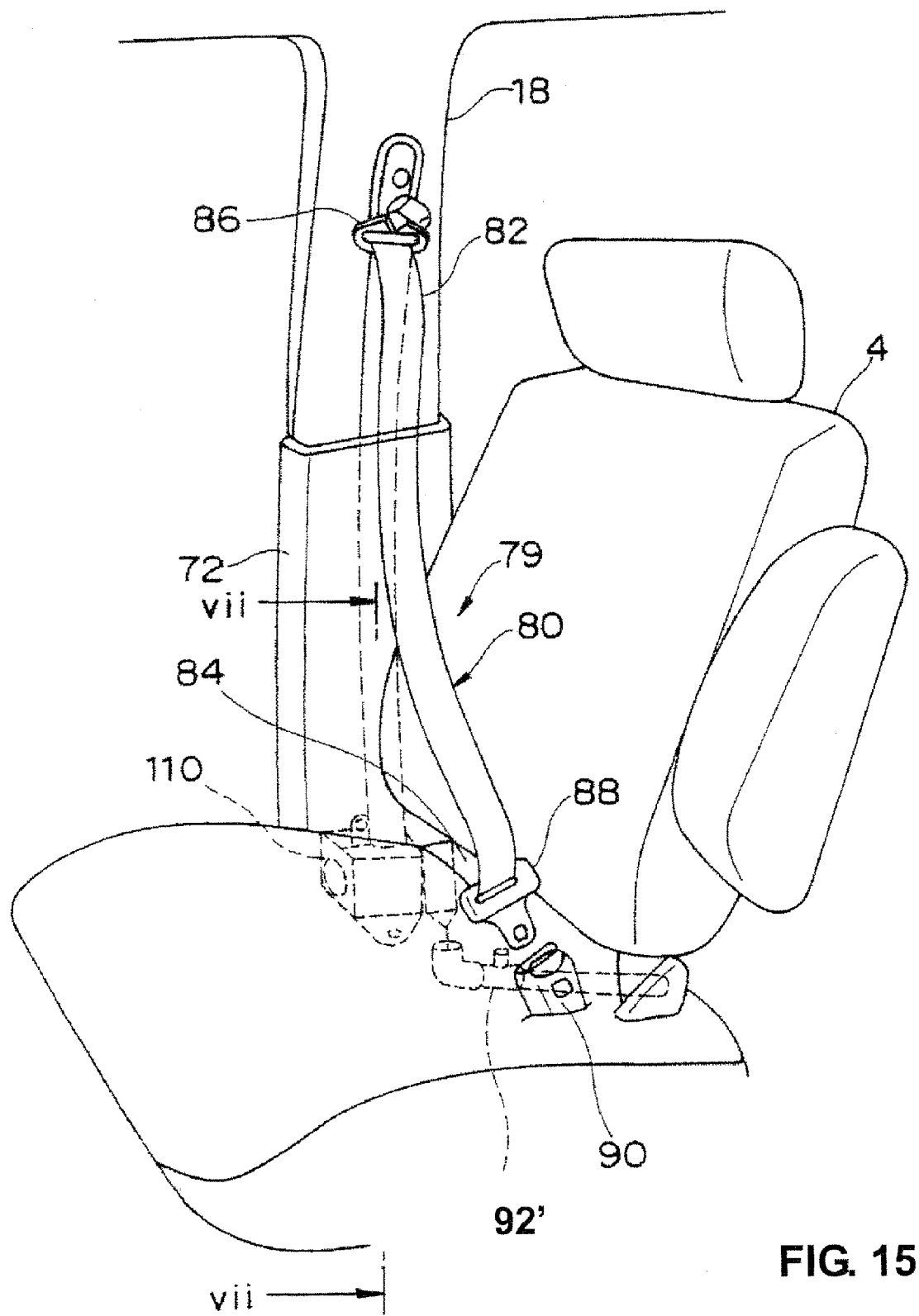
FIG. 15 is a perspective view of the three-point seatbelt device of the second embodiment.
Figure 16:
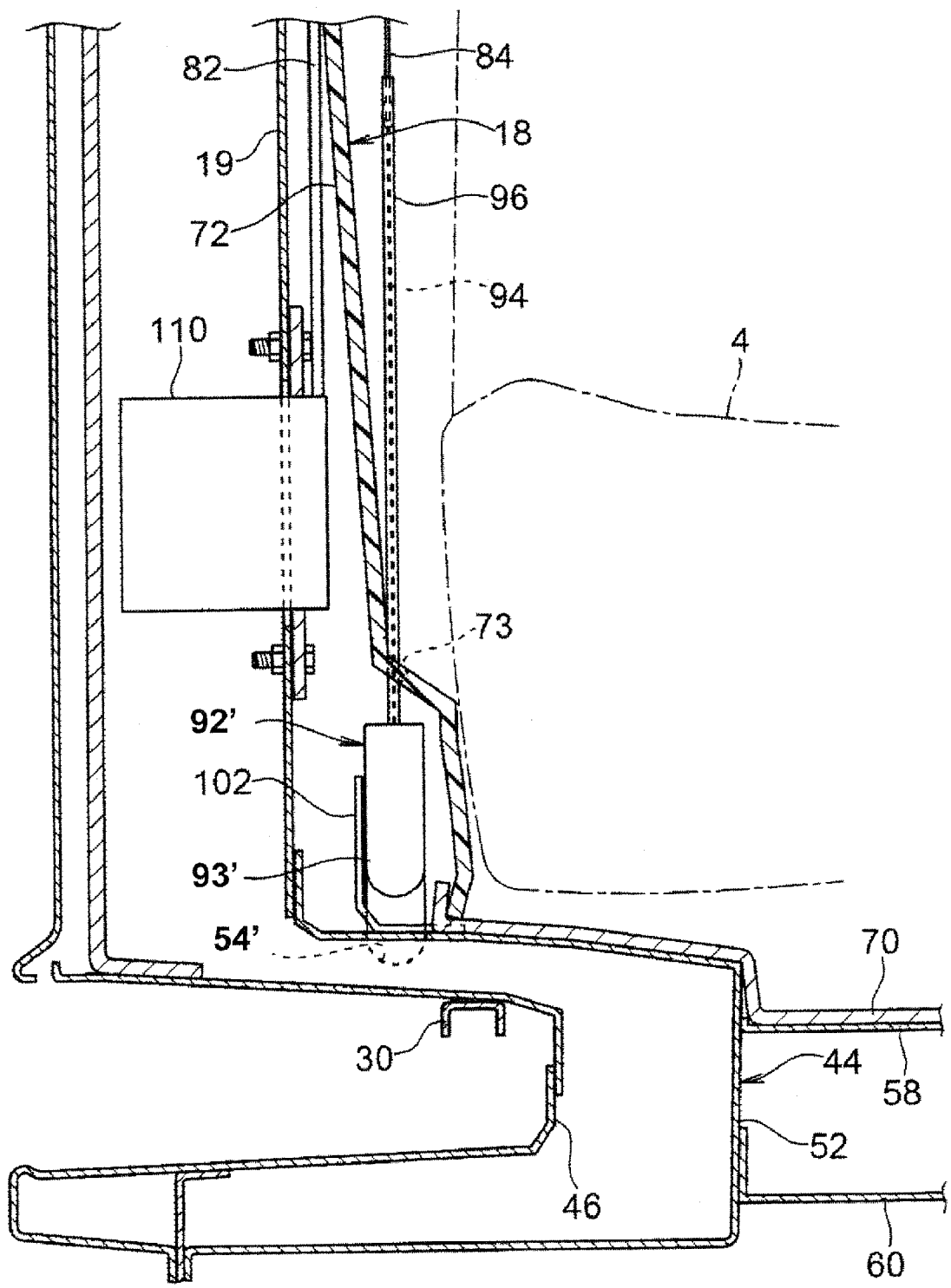
FIG. 16 is a sectional view taken along line vii-vii of FIG. 15 showing structure around the lap-belt pre-tensioner of the second embodiment.
Figure 17:
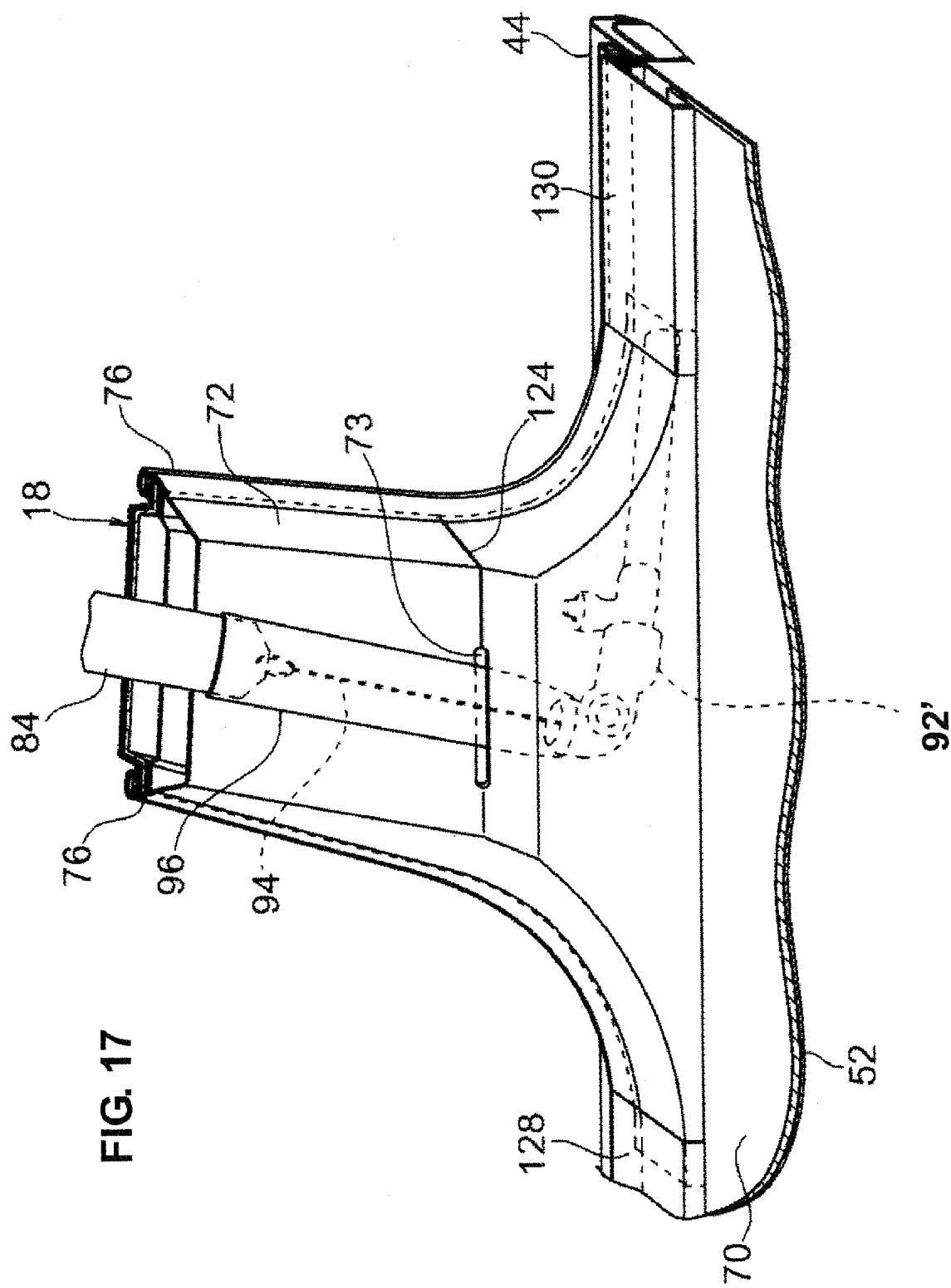
FIG. 17 is a perspective view of the lower end portion of the pillar trim of the second embodiment.

FIG. 10 is an enlarged sectional view showing the fixing portion of the outer panel 15, the inner panel 19 and the reinforcement 17. As shown in FIG. 10, the outer panel 15, the inner panel 19 and the reinforcement 17 have respective flanges 151, 171, 191 at their rear end portions. Herein, likewise, the outer panel 15, the inner panel 19 and the reinforcement 17 have respective flanges 151, 171, 191 at their front end portions. The flanges 151, 171, 191 are fixed to each other with welding, bolts or the like. The seaming welt 76 includes a base portion 131 which extends laterally, a pair of holing pieces 134, 136 which extends forward from the base portion 131, and a cover piece 138 which extends toward the inside of the vehicle compartment from the base portion 131. The holding pieces 134, 136 are formed with a lateral-direction gap therebetween. A ring-shaped weather strip 132 is formed integrally at the holding piece 134 so as to project toward the outside of the vehicle compartment. The seaming welt 76 is attached along a whole length of the flanges 151, 171, 191 with the pair of holding pieces 134, 136.

Returning to FIG. 8, the pillar trim 72 has a reverse-T shape when seen from the inside of the vehicle compartment. That is, the pillar trim 72 includes a vertical portion which extends vertically and a horizontal portion which extends longitudinally from a lower end of the vertical portion. Both ends of the horizontal portion of the pillar trim 72 are covered with scuff plates 128, 130 respectively. As shown in FIGS. 7 and 8, the vertical portion of the pillar trim 72 bends at a first bent portion 120 and a second bent portion 122 in such a manner that its lower end portion projects toward the inside of the vehicle compartment. Thus, the lap-belt pre-tensioner 92 is covered with the lower end portion of the pillar trim 72 from the inside of the vehicle compartment. The first and second bent portions 120, 122 are formed so as to extend longitudinally straightly. A through hole 73 is formed at the first bent portion 120. The through hole 73 is an elongated hole as shown. The wire 94 of the lap-belt pre-tensioner 92 and the cover member 96 located over the wire 94 are inserted into the through hole 73. Further, at the pillar trim 72 is formed a notch 124 which extends from the through hole 73 to the rear end of the pillar trim 72. Thereby, attaching of the wire 94 and the cover member 96 into the through hole 73 of the pillar trim 72 or detaching of those from the through hole 73 can be easily conducted through the notch 124 in a state in which the seat belt 80, the lap-belt pre-tensioner 92 and the seat 4 are attached. Accordingly, this attaching/detaching operation can be conducted in the longitudinal direction of the vehicle, so that the attachment/detachment of the pillar trim 72 can be easily conducted even in a narrow space between the seat 4 and the center pillar 18. Further, the notch 124 is formed at the first bent portion 120. Thus, since the through hole 73 and the notch 124 are formed along the first bent portion 120 so as to be made unnoticeable as much as possible, a proper appearance of the inside of the vehicle compartment (interior) can be maintained.

The pillar trim 72 is made of a resilient member, and the notch 124 is configured such that a resiliency of the pillar trim 72 makes the notch 124 in a closed state when no load is applied. Thereby, the wire 94 and the cover member 96 which are inserted into the through hole 73 can be surely held inside the through hole 73. Resin, for example, polypropylene, may be applied as a material of the pillar trim 72.

As shown in FIGS. 9 and 10, at one end of the pillar trim 72 are provided arm portions 126 as a fixed portion to be fixed to the seaming welt 76. As shown in FIG. 8, the arm portions 126 are disposed at plural positions of the end portion of the pillar trim which include an upper peripheral portion and a lower peripheral portion of the end portion of the notch 124. As shown in FIG. 10, the arm portions 126 are formed so as to have its U-shaped cross section, and the inside holding piece 136 of the seaming welt 76 is inserted into the arm portions 126. The arm portions 126 with the holding portion 136 therein are held by the pair of holding pieces 134, 136, along with the respective flanges 151, 171, 191 of the inner panel 15, the outer panel 19 and the reinforcement 17. Thus, they are fixed with the seaming welt 76. Accordingly, since the pillar trim 72 is fixed to the seaming welt 76 at the upper and lower peripheral portions of the notch 124, the notch portion can be made in the closed state surely. Thus, the notch 124 can be made further unnoticeable.

Returning to FIG. 7, while the lower end portion of the pillar trim 72 projects toward the inside of the vehicle compartment so as to cover the pre-tensioner 92, this projecting portion of the pillar trim 72 is disposed in a dead space beside the seat 4 which is formed along the side sill 44. Further, since the retractor 110 equipped with the shoulder-belt pre-tensioner is disposed on the outside of the lap belt 84, it may not necessary that the pillar trim 72 is provided so as to project toward the inside of the vehicle compartment above the lap-belt pre-tensioner 92. Thus, both the lap-belt pre-tensioner 92 and the shoulder-belt pre-tensioner 110 can be properly disposed without narrowing the space of the vehicle compartment.

Embodiment 2

FIGS. 11-18 shows an occupant protection device according to a second embodiment of the present invention. Hereinafter, the same structure/components of the second embodiment as those of the above-described first embodiment are denoted by the same reference characters, specific descriptions of which will be omitted.

The difference of the present embodiment from the above-described first embodiment is that a lap-belt pre-tensioner 92' is disposed on the upper face of the projecting portion 52 so as to extend rearward from the disposition portion of the lower support member 102, not extending forward.

Likewise, the lap-belt pre-tensioner 92' comprises a substantially cylindrical-shaped cylinder 93', a piston (not illustrated) accommodated in the cylinder 93', a gas generator, such as a powder, accommodated in the cylinder 93', and an igniter 95' to ignite the gas generator.

Figure 18:
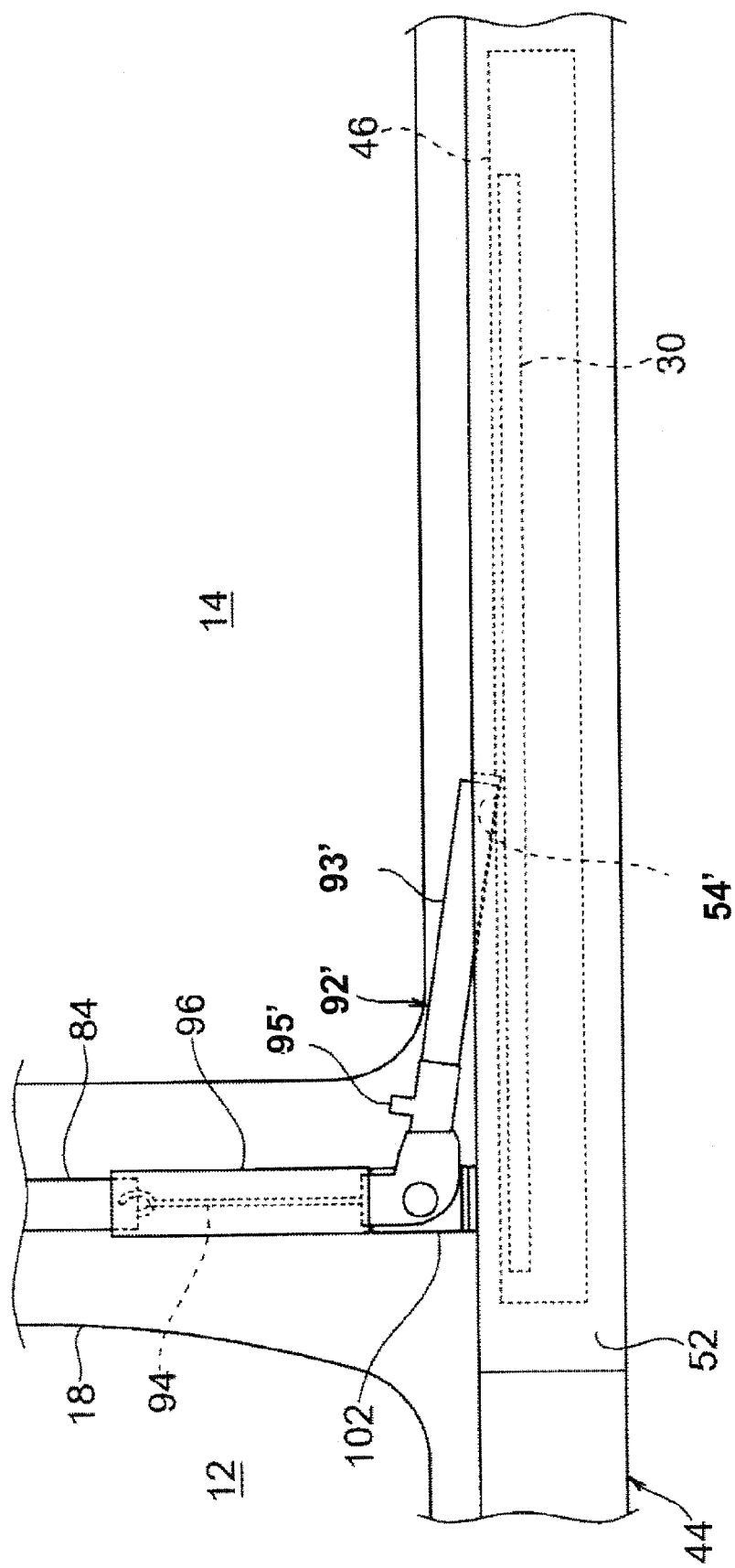
FIG. 18 is a side view showing a projecting portion of the side sill and its surrounding of the second embodiment.

Meanwhile, as shown in FIG. 18, a groove portion 54' to accommodate a tip portion of the lap-belt pre-tensioner 92', which is formed on the upper face of the projecting portion 52, is provided at a position which is rearward from the center pillar 18. Accordingly, a specified portion which is located from the center to the rear end of the pre-tensioner 92' inserted into the groove portion 54' is disposed rearward from the first row seat 4, so that the attaching/detaching operation or maintenance of the pre-tensioner 92' can be conducted easily even in a state in which the seat 4 has been attached. Further, the groove portion 54' is configured such that its rearward portion lowers gradually. Thereby, the rear end portion of the lap-belt pre-tensioner 92' can be prevented from projecting upward from the side sill 44, so that the lap-belt pre-tensioner 92' can be prevented properly from projecting into the ingress-egress opening 14 for the rear seat, positioning the lower anchor 102 at a proper location relative to the first row seat 4. As a result, the smooth ingress or egress for the rear seats 6, 8 and the seat assembling can be properly achieved. The wall face of the groove portion 54' has a shape which corresponds to a shape of the outer peripheral face of the lap-belt pre-tensioner 92', so that the lap-belt pre-tensioner 92' inserted into the groove portion 54' can be temporally fixed at the groove portion 54'. Thus, the assembly of the pre-tensioner 92' can be improved. Herein, the portion of the pre-tensioner 92' inserted into the groove portion 54' may be fixed to the upper face of the projecting portion 52 via a bracket or the like (not illustrated).

Other advantages of the present embodiment are similar to those of the above-described first embodiment.

The present invention should not be limited to the above-described embodiments.

For example, while the notch 124 of the pillar trim 72 is formed so as to extend from the through hole 73 to the rear end of the pillar trim 72 in the above-described embodiments, it may be formed from the through hole 73 to a front end of the pillar trim 72.

Also, the through hole 73 and the notch 124 are formed at the first bent portion 120 in the above-described embodiments, they may be formed at the second bent portion 122.

Further, the structure in which the wire 94 and the cover member 96 are inserted into the through hole 73 of the pillar trim was described in the above-described embodiments, the present invention may be applied to a case in which the lap belt 84 is inserted into the through hole 73.

What is claimed is:

1. In occupant protection device of vehicle, comprising:
   a side sill provided at both sides of a vehicle floor so as to extend in a longitudinal direction of the vehicle;
   an ingress-egress opening provided above the side sill;
   a seat provided on the vehicle floor near the ingress-egress opening;
   a slide door operative to move so as to slide in the longitudinal direction of the vehicle and close at least part of the ingress-egress opening;
   a projecting portion provided at the side sill so as to project toward an inside of a vehicle compartment in a vehicle width direction and accommodate a rail for guiding the slide door;
   a three-point seatbelt device including a seatbelt which has a shoulder belt operative to support an occupant by extending obliquely from a shoulder to a waist of the occupant and a lap belt operative to protect the occupant by extending laterally over the waist of the occupant, an upper support member to support an upper end of the shoulder belt, and a lower support member to support an outside end of the lap belt,
   wherein a lap-belt pre-tensioner operative to draw in the lap belt is disposed on an upper face of said projecting portion so as to extend in the longitudinal direction of the vehicle from an disposition portion of said lower support member, and on the upper face of the projecting portion is provided a groove portion so as to accommodate said lap-belt pre-tensioner in such a manner that the lap-belt pre-tensioner substantially does not project into said ingress-egress opening.

2. The occupant protection device of a vehicle of claim 1, wherein said lap-belt pre-tensioner is disposed on the upper face of the projecting portion so as to extend forward from the disposition portion of the lower support member.

3. The occupant protection device of a vehicle of claim 2, wherein said ingress-egress opening is separated into a front opening and a rear opening by a pillar which extends upward from a specified portion of the side sill near the seat, said slide door is a door operative to close the rear opening of the ingress-egress opening, said projecting portion is provided so as to extend rearward from the specified portion of the side sill near the seat, and said groove portion is formed at a front end portion of the projecting portion.

4. The occupant protection device of a vehicle of claim 2, wherein a rail box which is provided so as to open to the outside of the vehicle compartment and accommodate the guide rail is accommodated by said projecting portion, and a front end portion of the rail box is provided so as to obliquely extend forward and toward the inside of the vehicle compartment such that an interference thereof with said groove portion is avoided.

5. The occupant protection device of a vehicle of claim 2, wherein said groove portion is configured such that a forward portion thereof lowers gradually.

6. The occupant protection device of a vehicle of claim 2, wherein a cross member is provided at the vehicle floor so as to extend in the vehicle width direction, an end portion of the cross member is provided so as to contact said projecting portion near said groove portion, and said lap-belt pre-tensioner is configured such that a rigidity thereof in the vehicle width direction is greater than that of the projecting portion.

7. The occupant protection device of a vehicle of claim 1, wherein said lap-belt pre-tensioner is disposed on the upper face of the projecting portion so as to extend rearward from the disposition portion of the lower support member.

8. The occupant protection device of a vehicle of claim 7, wherein said ingress-egress opening is separated into a front opening and a rear opening by a pillar which extends upward from a specified portion of the side sill near the seat, said slide door is a door operative to close the rear opening of the ingress-egress opening, said projecting portion is provided so as to extend rearward from the specified portion of the side sill near the seat, and said groove portion is formed at a specified portion of the projecting portion which is rearward from the pillar.

9. The occupant protection device of a vehicle of claim 7, wherein said groove portion is disposed so as not to overlap with the guide rail in a plan view.

10. The occupant protection device of a vehicle of claim 9, wherein said lower support member is disposed on the outside of the guide rail, said groove portion is disposed on the inside of the guide rail, and said lap-belt pre-tensioner is disposed so as to intersect the guide rail in the plan view.

11. The occupant protection device of a vehicle of claim 7, wherein said groove portion is configured such that a rearward portion thereof lowers gradually.

12. The occupant protection device of a vehicle of claim 1, wherein a wall face of said groove portion has a specified shape which can temporally fix said lap-belt pre-tensioner into the groove portion.

13. The occupant protection device of a vehicle of claim 1, wherein a retractor operative to wind up one end of the shoulder belt and a shoulder-belt pre-tensioner operative to draw in the shoulder belt are disposed above and on the outside of the lap-belt pre-tensioner so as to be covered with a pillar trim, which covers the inside of the pillar, from the inside of the vehicle compartment.

14. The occupant protection device of a vehicle of claim 1, wherein said pillar is comprised of a plurality of panels which have a flange at least one end thereof in the longitudinal direction, a seaming welt is provided at the pillar so as to cover the flanges of the plural panels overlapped with each other, a pillar trim is provided so as to cover the inside of the pillar, said lower support member and said lap-belt pre-tensioner are provided at or near a lower end portion of the pillar, the lap-belt pre-tensioner is covered with the pillar trim from the inside of the vehicle compartment, and the pillar trim includes a through hole, through which a member extending from the lap belt to the lap-belt pre-tensioner or the lap belt itself extend, a notch which is provided so as to extend from the through hole to one end of the pillar trim in the longitudinal direction, and a fixed portion which is fixed at least to an upper peripheral portion of the seaming welt above an end portion of the notch and a lower peripheral portion of the seaming welt below the end portion of the notch.

15. The occupant protection device of a vehicle of claim 14, wherein said pillar trim is made of a resilient member, and said notch is configured such that a resiliency of the pillar trim makes the notch in a closed state when no load is applied.

16. The occupant protection device of a vehicle of claim 1, wherein a pillar trim is provided so as to cover the inside of the pillar, said lower support member and said lap-belt pre-tensioner are provided at or near a lower end portion of the pillar, the lap-belt pre-tensioner is covered with the pillar trim from the inside of the vehicle compartment, the pillar trim includes a straight bent portion which extends substantially in the longitudinal direction, a through hole, through which a member extending from the lap belt to the lap-belt pre-tensioner or the lap belt itself extend, and a notch which is provided so as to extend from the through hole to one end of the pillar trim in the longitudinal direction, and the through hole and the notch are formed at the bent portion.

17. The occupant protection device of a vehicle of claim 16, wherein said pillar trim is made of a resilient member, and said notch is configured such that a resiliency of the pillar trim makes the notch in a closed state when no load is applied.

18. An occupant protection device of vehicle, comprising:
a side sill provided at both sides of a vehicle floor so as to extend in a longitudinal direction of the vehicle;
an ingress-egress opening provided above the side sill;
a seat provided on the vehicle floor near the ingress-egress opening;
a slide door operative to move so as to slide in the longitudinal direction of the vehicle and close at least part of the ingress-egress opening;
a projecting portion provided at the side sill so as to project toward an inside of a vehicle compartment in a vehicle width direction and accommodate a rail for guiding the slide door;
a three-point seatbelt device including a seatbelt which has a shoulder belt operative to support an occupant by extending obliquely from a shoulder to a waist of the occupant and a lap belt operative to protect the occupant by extending laterally over the waist of the occupant, an upper support member to support an upper end of the shoulder belt, and a lower support member to support an outside end of the lap belt,
wherein a lap-belt pre-tensioner operative to draw in the lap belt is disposed on an upper face of said projecting portion so as to extend in the longitudinal direction of the vehicle from an disposition portion of said lower support member.

19. The occupant protection device of a vehicle of claim 18, wherein said lap-belt pre-tensioner is disposed on the upper face of the projecting portion so as to extend forward from the disposition portion of the lower support member.

20. The occupant protection device of a vehicle of claim 19, wherein said ingress-egress opening is separated into a front opening and a rear opening by a pillar which extends upward from a specified portion of the side sill near the seat, said slide door is a door operative to close the rear opening of the ingress-egress opening, said projecting portion is provided so as to extend rearward from the specified portion of the side sill near the seat, and at a front end portion of the upper face of the projecting portion is provided a groove portion so as to accommodate said lap-belt pre-tensioner in such a manner that the lap-belt pre-tensioner substantially does not project into said ingress-egress opening.

21. The occupant protection device of a vehicle of claim 19, wherein a rail box which is provided so as to open to the outside of the vehicle compartment and accommodate the guide rail is accommodated by said projecting portion, on the upper face of the projecting portion is provided a groove portion so as to accommodate said lap-belt pre-tensioner in such a manner that the lap-belt pre-tensioner substantially does not project into said ingress-egress opening, and a front end portion of the rail box is provided so as to obliquely extend forward and toward the inside of the vehicle compartment such that an interference thereof with said groove portion is avoided.

22. The occupant protection device of a vehicle of claim 19, wherein on the upper face of the projecting portion is provided a groove portion so as to accommodate said lap-belt pre-tensioner in such a manner that the lap-belt pre-tensioner substantially does not project into said ingress-egress opening, a cross member is provided at the vehicle floor so as to extend in the vehicle width direction, an end portion of the cross member is provided so as to contact said projecting portion near said groove portion, and said lap-belt pre-tensioner is configured such that a rigidity thereof in the vehicle width direction is greater than that of the projecting portion.

23. The occupant protection device of a vehicle of claim 18, wherein a retractor operative to wind up one end of the shoulder belt and a shoulder-belt pre-tensioner operative to draw in the shoulder belt are disposed above and on the outside of the lap-belt pre-tensioner so as to be covered with a pillar trim, which covers the inside of the pillar, from the inside of the vehicle compartment.

24. The occupant protection device of a vehicle of claim 18, wherein said pillar is comprised of a plurality of panels which have a flange at least one end thereof in the longitudinal direction, a seaming welt is provided at the pillar so as to cover the flanges of the plural panels overlapped with each other, a pillar trim is provided so as to cover the inside of the pillar, said lower support member and said lap-belt pre-tensioner are provided at or near a lower end portion of the pillar, the lap-belt pre-tensioner is covered with the pillar trim from the inside of the vehicle compartment, and the pillar trim includes a through hole, through which a member extending from the lap belt to the lap-belt pre-tensioner or the lap belt itself extend, a notch which is provided so as to extend from the through hole to one end of the pillar trim in the longitudinal direction, and a fixed portion which is fixed at least to an upper peripheral portion of the seaming welt above an end portion of the notch and a lower peripheral portion of the seaming welt below the end portion of the notch.

25. The occupant protection device of a vehicle of claim 18, wherein a pillar trim is provided so as to cover the inside of the pillar, said lower support member and said lap-belt pre-tensioner are provided at or near a lower end portion of the pillar, the lap-belt pre-tensioner is covered with the pillar trim from the inside of the vehicle compartment, the pillar trim includes a straight bent portion which extends substantially in the longitudinal direction, a through hole, through which a member extending from the lap belt to the lap-belt pre-tensioner or the lap belt itself extend, and a notch which is provided so as to extend from the through hole to one end of the pillar trim in the longitudinal direction, and the through hole and the notch are formed at the bent portion.

* * * * *